(12) United States Patent
Mehmood et al.

(10) Patent No.: US 12,710,530 B2
(45) Date of Patent: Aug. 18, 2026

(54) SINGLE RADAR SYSTEM FOR MULTIPLE APPROACHES

(71) Applicant: Wavetronix LLC, Provo, UT (US)

(72) Inventors: Rashid Mehmood, Springville, UT (US); David V. Arnold, Springville, UT (US); Jon W. Wallace, Springville, UT (US); Attiya Mahmood, Springville, UT (US)

(73) Assignee: WAVETRONIX LLC, Springville, UT (US)

( * ) Notice: Subject to any disclaimer, the term of this patent is extended or adjusted under 35 U.S.C. 154(b) by 446 days.

(21) Appl. No.: 18/336,727

(22) Filed: Jun. 16, 2023

(65) Prior Publication Data

US 2023/0408683 A1 Dec. 21, 2023

Related U.S. Application Data

(60) Provisional application No. 63/359,627, filed on Jul. 8, 2022, provisional application No. 63/353,615, filed on Jun. 19, 2022, provisional application No. 63/353,614, filed on Jun. 19, 2022.

(51) Int. Cl.
*G01S 13/91* (2006.01)
*G01S 7/03* (2006.01)

(52) U.S. Cl.
CPC ................ *G01S 13/91* (2013.01); *G01S 7/03* (2013.01)

(58) Field of Classification Search
CPC .................................. G01S 13/91; G01S 7/03
See application file for complete search history.

(56) References Cited

U.S. PATENT DOCUMENTS 4,908,615 A * 3/1990 Bayraktaroglu ........ H01L 24/32 257/E27.012
5,161,107 A * 11/1992 Mayeaux ............. G06V 10/143 382/104
5,509,082 A * 4/1996 Toyama ................... G08G 1/04 382/104
5,572,202 A * 11/1996 Regel ....................... G08G 1/07 340/944
5,629,691 A * 5/1997 Jain ........................ G08G 5/727 342/36
5,774,569 A * 6/1998 Waldenmaier ....... G06V 10/147 382/104
5,809,161 A * 9/1998 Auty ...................... G08G 1/054 382/104
5,926,114 A * 7/1999 Andrews ................ G08G 1/164 340/904

(Continued)

OTHER PUBLICATIONS

Non-Final Office Action received for U.S. Appl. No. 18/615,693, mailed on Jan. 27, 2026, 15 pages.

*Primary Examiner* — Peter M Bythrow
(74) *Attorney, Agent, or Firm* — Workman Nydegger

(57) ABSTRACT

A radar system for monitoring vehicles on a roadway comprises a radar control unit a radar subsystem including one or more antennas. The radar subsystem is in communication with the radar control unit. The radar system is configured to be positioned with the one or more antennas at a single position relative to an intersection. Additionally, the radar system is configured to receive radar data from all traffic entrances into the intersection using the radar subsystem.

20 Claims, 8 Drawing Sheets

(56) References Cited

U.S. PATENT DOCUMENTS 6,177,885 B1 * 1/2001 Weil .................... G08G 1/0104 340/937
6,556,916 B2 * 4/2003 Waite .................. G08G 1/0133 340/933
6,693,557 B2 * 2/2004 Arnold ................ H01Q 13/106 340/928
6,781,523 B2 * 8/2004 Matsui ................ G07B 15/063 340/933
7,408,479 B2 * 8/2008 Johnson ................ G08G 1/095 340/916
7,573,400 B2 * 8/2009 Arnold ................... G01S 13/91 340/916
7,663,505 B2 2/2010 Publicover
7,821,422 B2 10/2010 Hutchison et al.
7,889,097 B1 2/2011 Arnold et al.
7,889,098 B1 * 2/2011 Arnold ................... G01S 13/42 340/933
7,924,170 B1 * 4/2011 Arnold .................... G08G 1/04 340/933
8,248,272 B2 * 8/2012 Arnold ................... G01S 13/89 340/936
8,498,448 B2 * 7/2013 Feris ..................... G06V 20/52 348/169
8,665,113 B2 * 3/2014 Arnold .................... G08G 1/04 340/933
9,412,271 B2 * 8/2016 Sharma ................... G08G 1/07
9,917,355 B1 * 3/2018 Lee ....................... H01Q 21/20
10,049,569 B2 * 8/2018 Arnold ................... G01S 13/91
10,055,986 B2 * 8/2018 Paruch .................... G08G 1/07
10,823,819 B2 * 11/2020 Loesch .................. G01S 13/42
11,269,049 B2 * 3/2022 Wu ....................... G01S 13/931
11,630,203 B2 * 4/2023 Dubois ................ G01S 13/426 342/26 D
2005/0046597 A1 * 3/2005 Hutchison ................ G08G 1/07 340/917
2006/0287807 A1 * 12/2006 Teffer .................. G08G 1/0175 701/117
2007/0096943 A1 * 5/2007 Arnold ................... G01S 13/66 340/925
2007/0152869 A1 * 7/2007 Woodington .......... G01S 13/48 342/72
2008/0012726 A1 * 1/2008 Publicover ....... G08G 1/096725 340/932
2010/0087967 A1 * 4/2010 Meyers .................. G01S 13/42 701/25
2010/0141479 A1 * 6/2010 Arnold ................... G01S 13/42 340/936
2010/0149020 A1 * 6/2010 Arnold ..................... G08G 1/08 342/90
2019/0383901 A1 * 12/2019 Elad ...................... G01S 13/42
2020/0234598 A1 * 7/2020 Ramirez Pavon ....... G07C 5/00
2020/0249343 A1 * 8/2020 Yu ......................... G01S 13/93
2021/0080580 A1 * 3/2021 Tsvelykh ............... G01S 17/48
2021/0239787 A1 * 8/2021 Li ......................... G01S 13/343
2023/0114899 A1 * 4/2023 Ay .......................... G01S 7/03 342/70
2024/0192312 A1 * 6/2024 Morinaka ............... G01S 13/91
2024/0230886 A1 7/2024 Mehmood et al.
2024/0264273 A1 * 8/2024 Manabe ................ G01S 7/4004
2025/0172682 A1 * 5/2025 Shabtay ................ G01S 13/931

* cited by examiner

SINGLE RADAR SYSTEM FOR MULTIPLE APPROACHES

CROSS-REFERENCE TO RELATED APPLICATIONS

This application claims the benefit of and priority to (1) U.S. Provisional Patent Application Ser. No. 63/353,615 filed on 19 Jun. 2022 and entitled "SINGLE RADAR SYSTEM FOR MULTIPLE APPROACHES," (2) U.S. Provisional Patent Application Ser. No. 63/353,614 filed on 19 Jun. 2022 and entitled "CENTRALIZED RADAR CONTROLLER SYSTEM," and (3) U.S. Provisional Patent Application Ser. No. 63/359,627 filed on 8 Jul. 2022 and entitled "INSIDE-THE-BOX TRAFFIC MONITORING SYSTEM." The entire contents of each of the aforementioned applications and/or patents are incorporated by reference herein in their entirety.

BACKGROUND

A transportation throughfare intersection is a planned point of conflict in a transportation throughfare system. Generally, trains, vehicles, pedestrians, cyclists, and other transportation throughfare users come together from various directions at the transportation throughfare intersection, making such an intersection complex. To allow different types of traffic arriving from different directions to safely traverse the intersection, the intersection is often signalized using one or more traffic signals. The traffic signals include signal lights (typically red, yellow, and green), train crossing arms or pedestrian or bicycle crossing signals to indicate to intersection users when it is safe to pass through the intersection. The signal lights or other traffic signals of the intersection are controlled by a traffic signal controller to allow non-conflicting traffic to concurrently pass through the intersection while preventing conflicting traffic from doing so.

Today's traffic engineers face a significant challenge in implementing intelligent and efficient signal controls. Effective signal control requires the use of modern sensors that can detect vehicles, trains, pedestrians, bicycles and other intersection users and present rich data—such as location, heading, speed, vehicle size, user type, etc.—about these users to the intersection control logic. These sensors are placed at different locations relative to the intersection, making their deployment and their coordination costly and inconvenient. For small- and medium-sized intersections, the cost and complexity can deter use of capable sensor systems in favor of simpler systems that do not provide the data required for optimal intersection control.

Detectors used at intersections are based on a variety of technologies and include video cameras, acoustic sensors, inductive loops, and radars. In typical embodiments of these detection devices, one or more detectors must be installed for each approach to the intersection to detect targets, which are typically automobiles, arriving at or waiting to pass through the intersection.

An example radar sensor for detection of vehicles and other users of an intersection is described in U.S. Pat. No. 7,889,097, "Detecting targets in roadway intersections," which patent is incorporated by reference herein in its entirety. This radar system uses multiple radar beams to identify targets located in a portion of a single roadway approaching the intersection. It can distinguish different targets based on their position within the portion of the intersection approach by detecting the angle and range (or distance) relative to the radar sensor. Because this radar sensor can only detect automobiles or other targets on a single intersection approach, a typical intersection would use one radar sensor mounted adjacent to each approach to detect vehicles on that approach, leading to high equipment, installation, and maintenance costs, particularly relative to other costs for small- and medium-sized intersections. Accordingly, there is a need for further improvements in this field.

The subject matter claimed herein is not limited to embodiments that solve only disadvantages or that operate only in environments such as those described above. Rather, this background is only provided to illustrate one exemplary technology area where some embodiments described herein may be practiced.

BRIEF SUMMARY

Disclosed embodiments comprise a radar system for monitoring vehicles on a roadway. The radar system comprises a radar control unit and a radar subsystem including one or more antennas. The radar subsystem is in communication with the radar control unit. The radar system is configured to be positioned with the one or more antennas at a single position relative to an intersection. Additionally, the radar system is configured to receive radar data from all traffic entrances into the intersection using the radar subsystem.

Additionally, disclosed embodiments comprise a method for monitoring vehicles on a transportation throughfare with a radar system. The method comprises positioning the radar system at a single position relative to an intersection. Additionally, the method comprises receiving, from one or more antennas within a radar subsystem, radar data from all traffic entrances into the intersection. The radar system comprises a radar control unit. Additionally, the radar subsystem is in communication with the radar control unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Figure 1A:
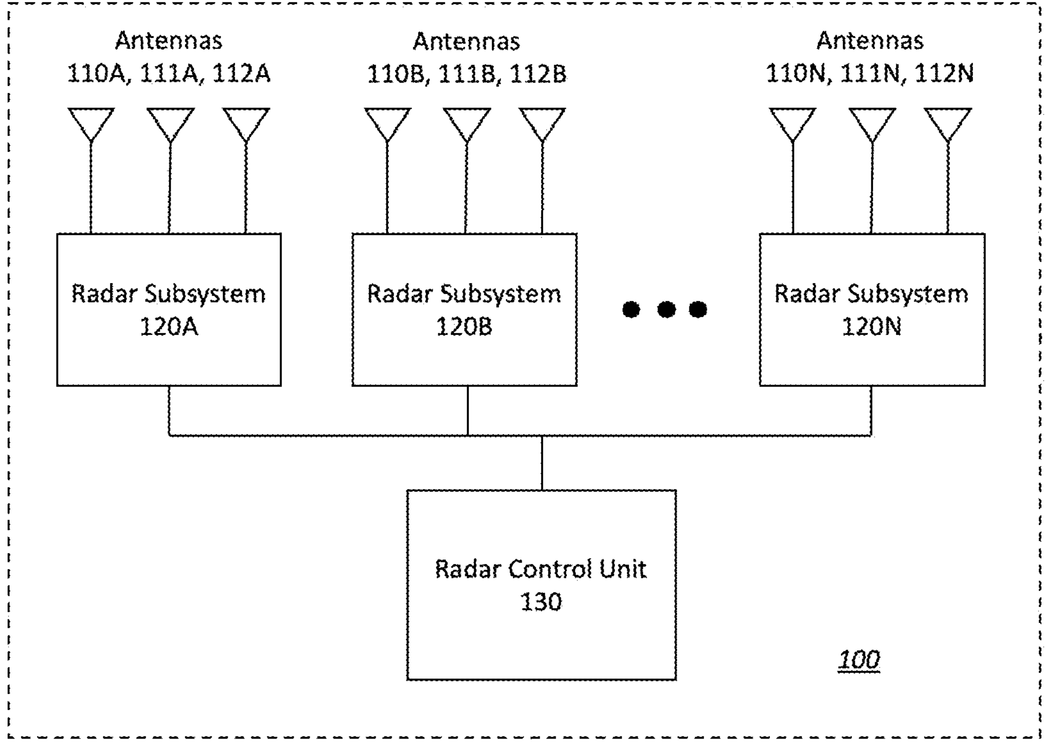
FIGS. 1A-1C illustrate schematics of various embodiments of radar systems.

Various problems with the prior art can be overcome by the principles of the present invention, including systems and methods for a single radar system that can detect targets on multiple approaches to the intersection. The single radar system is configured to be positioned at a single location relative to an intersection and to receive radar return data from multiple traffic entrances into the intersection. Typical embodiments of the radar system include a single control unit that receives radar return data from one or more radar subsystems. Each radar subsystem comprises radio frequency and baseband electronics, a processor, a transmitter, and one or more antennas, and it is designed to provide radar return data from a specific portion of the roadway entering or exiting the intersection.

One benefit of this single radar system is that it requires installation of a single device at a single location relative to the intersection. This reduces the labor involved in installing or maintaining the device, the number of cables required to power the radar system and to connect it to the traffic controller system, and the disruption to the traffic using the intersection during installation or maintenance, thereby reducing the complexity and cost of installation and maintenance.

Another benefit of the single radar system is that, because the multiple radar subsystems are mechanically affixed together using structural mounting points during device manufacturing, their relative positions and pointing angles can be precisely controlled, allowing the single radar system to be configured to include precise information about the relative portions of the roadway monitored by each radar subsystem. Furthermore, because of this rigid mechanical connection of multiple radar subsystems during manufacturing, any errors in relative positions and pointing angles of the multiple radar subsystems can be measured in the factory, and calibration methods can be used to remove the effect of these errors before the unit is installed at the intersection. As such, during installation or maintenance, the traffic engineer can align the single radar system relative to the intersection and ensure that all radar subsystems are properly aligned with their respective portions of the roadway.

Another benefit of the single radar system is that it provides a single, coordinated measurement of the positions, heading, speed, and other parameters of targets in multiple or all approaches to the intersection. The single radar system can therefore provide rich data that is useful for analysis of traffic flow and optimization of the signalized intersection control that improves traffic flow.

Additionally, in at least one embodiment the single radar system is configured to additionally detect targets within the interior of the intersection, and therefore it can track vehicles from their origin to their destination in the intersection. This provides additional data useful for analysis of traffic flow and optimization of the signalized intersection control.

FIG. 1A illustrates a schematic of an embodiment of a radar system 100. The system 100 may comprise a single radar control unit 130 in communication with one or more radar subsystems 120A, 120B, . . . 120N. Each radar subsystem includes one or more radar antennas. For example, radar subsystem 120A includes antennas 110A, 111A, 112A, 113A, 114A, . . . . Each of the antennas in the one or more radar antennas 110A, 111A, 112A, 113A, 114A, . . . are positioned so that each radar subsystem can use the antennas advantageously to detect targets within a unique portion of the roadway leading up to the intersection. In at least one embodiment, a set of the one or more antennas may be used for transmission, while another set of the one or more antennas may be used for reception. Additionally or alternatively, in at least one embodiment, at least a portion of the one or more antennas are used for both reception and transmission.

The entire radar system is located at a common single position relative to an intersection. As used herein, a "common single position" comprises a single position relative to an intersection, such as a common corner of the intersection, a common cross bar over the intersection, or some other shared location relative to the roadways. Further, the "common single position" may further include a shared support structure that physically supports the radar control unit and the radar subsystem, (including the one or more antennas), such that the radar system is attached to a common support structure. In at least one embodiment, the common support structure may comprise a shell that at least partially encompasses the radar control unit, the radar subsystem (including the one or more antennas). Additionally, in at least one embodiment, the common support structure is separate from a traffic control fixture such as a cross arm, pole, or some other fixture that is present at an intersection separate from the radar system.

Each radar subsystem of the one or more radar subsystems 120A, 120B, . . . 120N can use its antennas in a way that is advantageous for detecting vehicles or other targets within the unique portion of the roadway monitored by that radar subsystem and that is compatible with the hardware and processing capabilities of the radar subsystem. For example, one or more antennas can be configured in a typical array to provide a shaped antenna beam that covers a portion of the roadway. Alternatively, one or more antennas can be used to steer the antenna beam across the portion of the roadway using conventional beamsteering techniques.

More advanced radar systems can configure the relative positions of the multiple antennas used by a single radar subsystem to facilitate joint transmit and receive beamsteering using multiple-input multiple-output (MIMO) radar techniques, as taught in Eran Fishler, Alex Haimovich, Rick Blum, Dmitry Chizhik, Len Cimini, Reinaldo Valenzuela, "MIMO Radar: An idea whose time has come," in *Proceedings of the* 2004 *IEEE Radar Conference*, Philadelphia, PA, USA, 29 Apr. 2004, pp. 71-78. Using this technology, the radar subsystem transmits a unique waveform from each of a set of the multiple antennas included in the radar subsystem, with each unique waveform being orthogonal to the other unique waveforms. The signal orthogonality can be achieved by using waveform modulation or by transmitting from each transmit antenna at a unique time.

In one embodiment, the antennas not used to transmit orthogonal waveforms are used to receive the radar returns. The receive antenna array may be a conventional array, with antennas placed in a straight line and spaced a half wavelength from each other at the center frequency of the radar waveforms, resulting in a receive antenna array of length L.

In this embodiment, the transmit antenna array is designed so that the antennas are placed in a straight line and spaced apart by a distance of L plus a half wavelength at the center frequency of the radar waveforms.

In this embodiment, because the waveforms transmitted from each antenna in the transmit antenna array are orthogonal, each receiver attached to an element of the receive antenna array can determine the radar return resulting from transmission by each unique transmit antenna. This results in a large virtual array, and traditional beamforming can be applied to the radar return signals from the virtual array to achieve high resolution in angle over the portion of the roadway with relatively simple antenna and radio frequency hardware configurations. Similar techniques can be found in K. W. Forsythe, D. W. Bliss, G. S. Fawcett, "Multiple-input multiple-output (MIMO) radar: performance issues," Conference Record of the Thirty-Eighth Asilomar Conference on Signals, Systems and Computers, Pacific Grove, CA, USA, 7-10 Nov. 2004, pp. 310-315.

The methods outlined in the preceding paragraphs are merely examples of ways to use antennas advantageously, with each requiring different hardware and processing capabilities of the radar subsystem. One of skill in the art will appreciate other ways to use the one or more antennas for each radar subsystem to detect vehicles on a specific portion of a roadway.

Figure 1B:
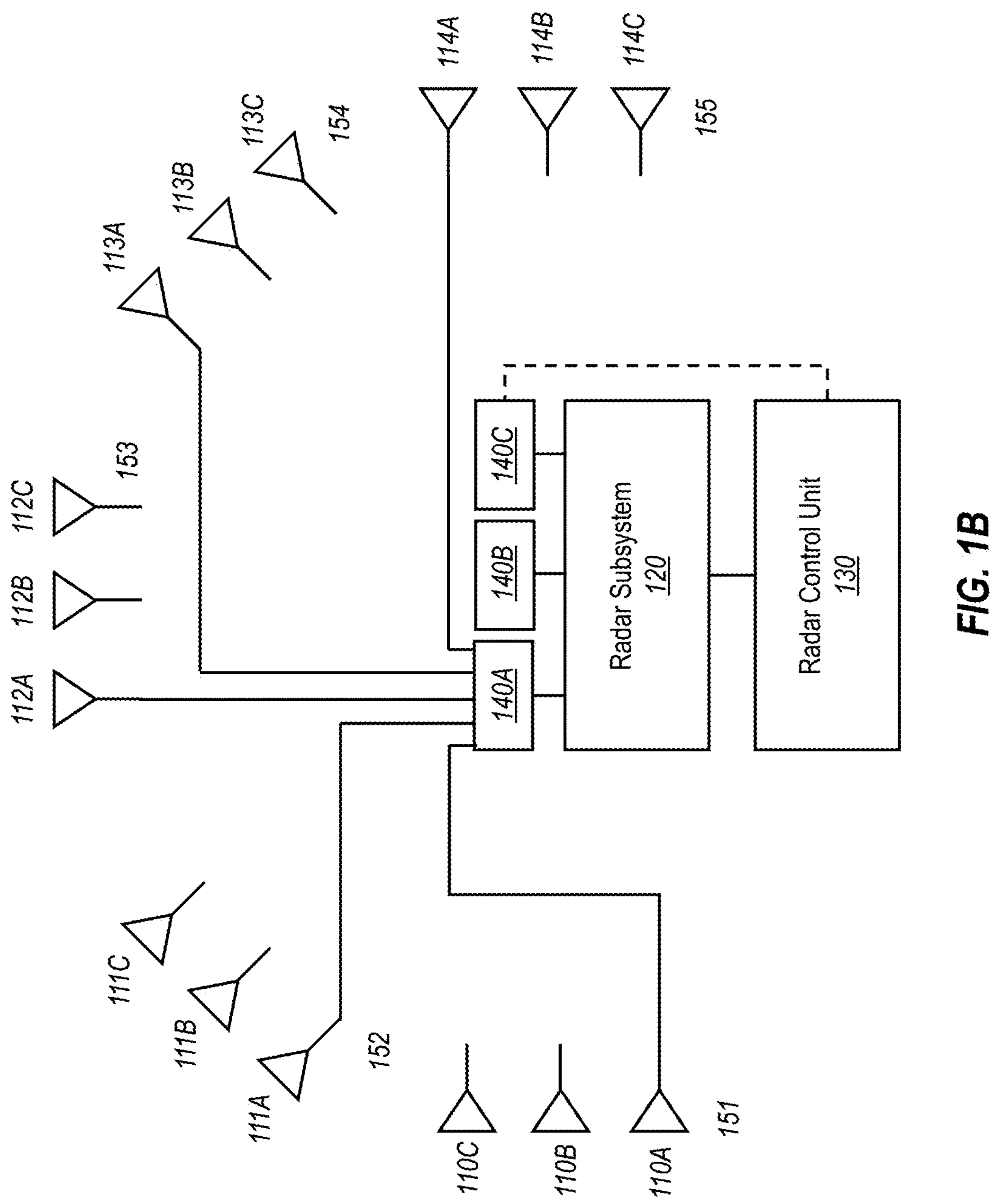

FIG. 1B illustrates a schematic of another embodiment of a radar system 100 that uses a single radar subsystem 120. Radar subsystem 120 has three antenna ports, with the first antenna port connected to switch 140A, the second antenna port connected to switch 140B, and the third antenna port connected to switch 140C. Radar system 100 has five antennas 151, 152, 153, 154, 155, with each antenna having three antenna elements. For example, antenna 151 has antenna elements 110A, 110B, and 110C.

In this embodiment, the radar subsystem 120 comprises the switches 140A, 140B, and 140C and the five antennas 151, 152, 153, 154, 155, with each antenna having three antenna elements. For the sake of example and clarity, FIG. 1B depicts connections from switch 140A to its respective antenna elements 110A, 110B, 110C, 110D, and 110E. One will appreciate that connections may exist between each of the switches 140A, 140B, 140C and the various antenna elements. Further, one of skill will appreciate that fewer or more than five antennas 151, 152, 153, 154, 155 may be present within the radar system 100.

Each switch 140A, 140B, and 140C can selectively connect a set of one out of five antenna elements 110A-114C to the radar subsystem 120. At any given time, radar control unit 130 will cause switches 140A, 140B, and 140C to connect to the radar subsystem 120 the three antenna elements that form a single antenna. For example, at one time, switches 140A, 140B, and 140C will connect antenna elements 111A, 111B, and 111C, respectively, to radar subsystem 120. At a later time, switches 140A, 140B, and 140C will connect antenna elements 112A, 112B, and 112C, respectively, to radar subsystem 120. As switches 140A, 140B, and 140C cycle through all five switch positions, they will sequentially connect all five antennas 151, 152, 153, 154, and 155 to the radar subsystem 120.

When switches 140A, 140B, and 140C connect one antenna 151, 152, 153, 154, or 155 to radar subsystem 120, radar subsystem 120 will use the connected antenna to detect vehicles over the subarea of the intersection illuminated by the connected antenna. By switching between the different antennas at a rate high enough such that vehicles, bicycles, pedestrians, or other objects in the intersection have not moved significantly relative to the size of the illumination area for each antenna, radar subsystem 120 is able to detect objects within or near the entire intersection.

Radar subsystem 120 may optionally be able to use the multiple antenna elements in each of the antennas 151, 152, 153, 154, and 155 to electronically scan the antenna beam over the subarea illuminated by the connected antenna. In this way, radar subsystem 120 can provide higher resolution in angle and therefore provide improved distinction between multiple objects within or near the entire intersection.

As a further enhancement, radar subsystem 120 may perform MIMO radar capability, which allows joint beamforming over transmit and receive antenna array elements. In this way, radar subsystem 120 can provide even higher resolution in angle and therefore additional distinction between multiple objects within or near the entire intersection.

Figure 1C:
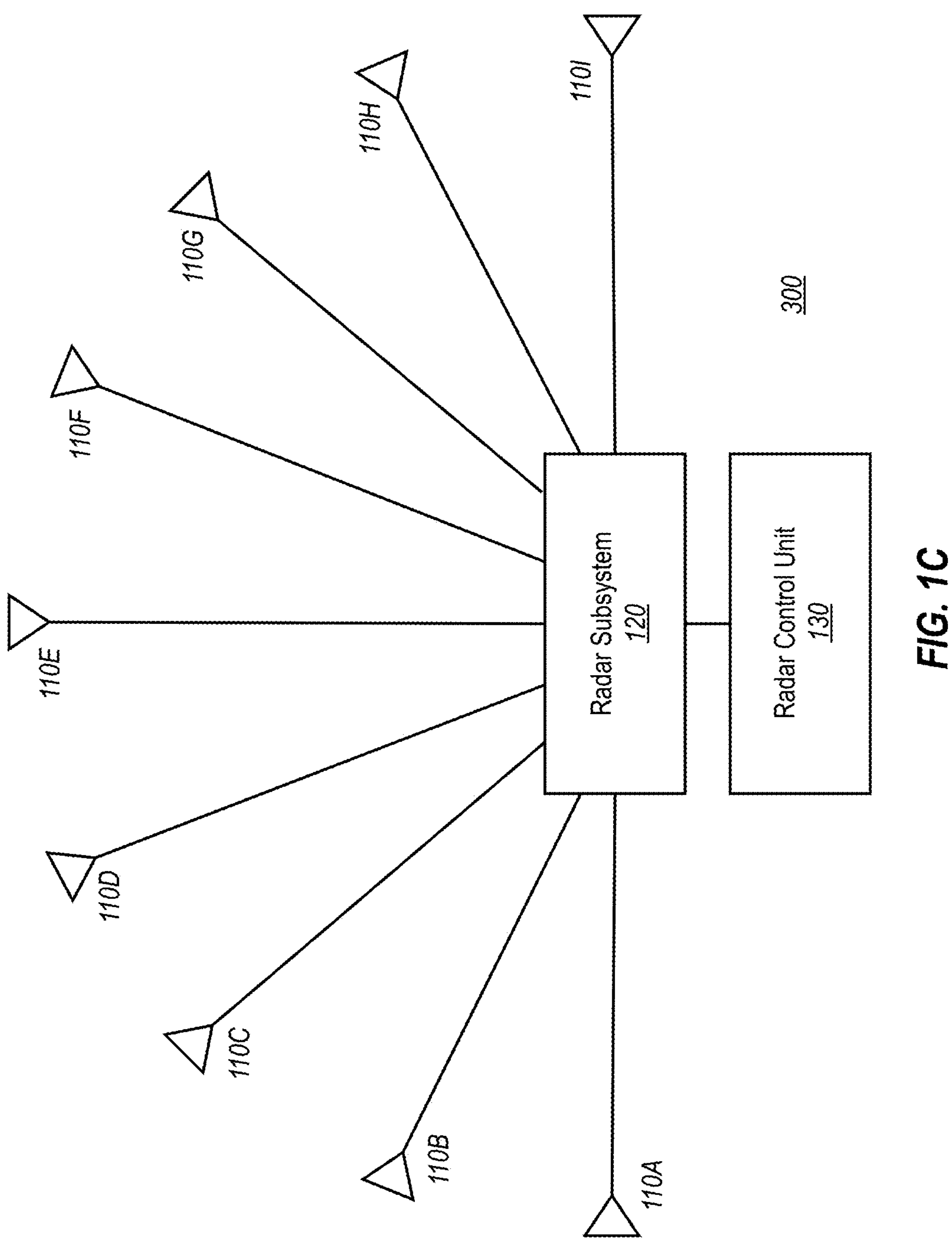

FIG. 1C illustrates a schematic of another embodiment of a radar system 100 that uses a single radar subsystem 120. In this embodiment, radar subsystem 120 has nine antenna ports, each of which is connected to a single antenna 110A, 110B, 110C, 110D, 110E, 110F, 110G, 110H, and 110I. Each antenna 110A-110I is pointed toward a different area of the intersection.

Radar subsystem 120 is capable of simultaneously transmitting a unique signal from each antenna 110A-110*i*. Radar subsystem 120 is further capable of processing the radar return received by each antenna 110A-110I independently. As explained above, if the unique transmit signals are orthogonal based on different times, frequencies, chirp rates, modulation codes, or other signal properties known in the art, radar subsystem 120 can separate the multiple returns on each antenna due to the unique transmissions from the multiple antennas.

Radar control unit 130 is configured with the information about the angular coverage of each of the antennas 110A-110*i*. Based on this information and on the separated radar returns processed by radar subsystem 120 and provided to radar control unit 130, radar control unit 130 can identify the angular positions of targets in the intersection. Using known radar ranging techniques, radar system controller can also identify the range of targets across the entire intersection. In this way, radar control unit 130 can estimate the position of each vehicle, pedestrian, bicycle, or other target in or near the intersection.

Figure 2:
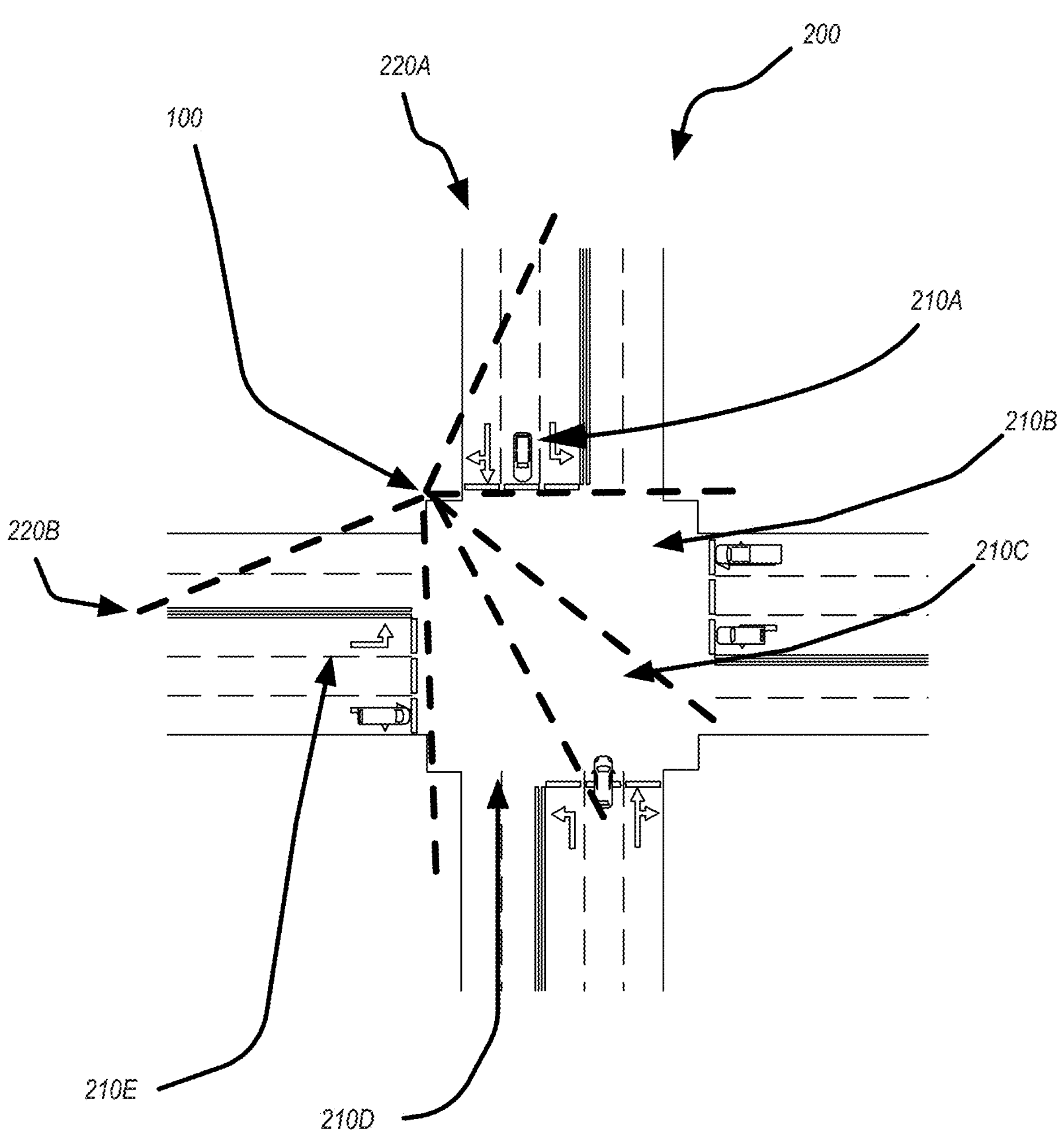
FIG. 2 illustrates an intersection utilizing an embodiment of the radar system.

FIG. 2 illustrates an intersection 200 utilizing an embodiment of radar system 100. In the depicted embodiment, two roadways 220A and 220B meet at an intersection. Each roadway comprises at least two lanes, with some of the roadways also comprising one or more turn lanes. The radar system 100 is located at a common single position, in this example, affixed to a pole on a corner of the intersection. The radar system 100 may comprise multiple radar antennas 110A, 111A, 112A, 110B, 111B, . . . configured to monitor all entries into the intersection from a single position.

FIG. 2 also depicts various fields of view (FOVs) 210A, 210B, 210C, 210D, 210E respectively associated with radar subsystems 120A, 120B, 120C, 120D, 120E within the radar system 100. Using the radar system 100 of FIG. 1A as a reference, the one or more antennas 110A, 111A, 112A within radar subsystem 120A are configured to provide radar returns from the field of view (FOV) 210A, while the antennas 110B, 111B, 112B within radar subsystem 120B are configured to provide radar returns from the FOV 210B. A similar description applies for the antennas within radar subsystems 120C, 120D, and 120E and the FOVs 210C, 210D, and 210E. As depicted, the exemplary radar system 100 comprises a first radar subsystem (e.g., 120A) with a FOV of 80°, a second radar subsystem with a FOV of 30°, a third radar subsystem with a FOV of 30°, a fourth radar subsystem with a FOV of 30°, and a fifth radar subsystem with a FOV of 80°.

In this embodiment, the radar system 100 can monitor an aggregate FOV of 250°. As shown in FIG. 2, radar system 100 can detect vehicles on all four approaches to intersection 200. In some cases, a single radar subsystem (e.g., radar subsystem 120A) can monitor a single approach to intersection 200. For example, a first radar subsystem 120A detects vehicles within the FOV 210A to monitor all lanes of approach on the top side of the intersection on roadway 220A. Alternatively, to detect vehicles in all lanes of approach, the radar system 100 must use radar subsystems associated with multiple different FOVs. Because the single radar system 100 knows the precise FOVs of each radar subsystem 120A, 120B, 120C, 120D, 120E, the control unit 130 can use the radar returns from all radar subsystems 120A, 120B, 120C, 120D, 120E together to create a comprehensive map of all vehicles entering, waiting to enter, or approaching the intersection.

The FOV of each radar subsystem in FIG. 2 may be carefully designed to provide the resolution necessary to distinguish between different vehicles within the radar subsystem FOV. For example, radar subsystem 120A is configured to detect vehicles within FOV 210A which includes the roadway 220A entering into the intersection 200. Because of the configuration, radar subsystem 120A distinguishes vehicles in different roadway lanes near the intersection stop bar based largely on their range (or distance) from the radar system 100. Therefore, radar subsystem 120A must ensure that its radar signaling is properly configured to resolve vehicles based on this range. Because the vehicles are relatively close to radar system 100, the angular resolution required to distinguish different vehicles along a single lane is relatively low, allowing radar subsystem 120A to have a broad FOV 210A and reduced angular resolution. In contrast, radar subsystem 120B is configured to detect vehicles within FOV 210B entering the intersection on the right from roadway 220B and must distinguish vehicles in separate lanes largely based on their angle relative to the radar system 100. Because of the longer distance of the vehicles from the radar system 100, radar subsystem 120B needs higher angular resolution to distinguish vehicles in different lanes. In this embodiment, it is determined that the FOV 210B of radar subsystem 120B must be 30°, which is much smaller than the FOV 210A of 80° required for radar subsystem 120A.

Figure 3:
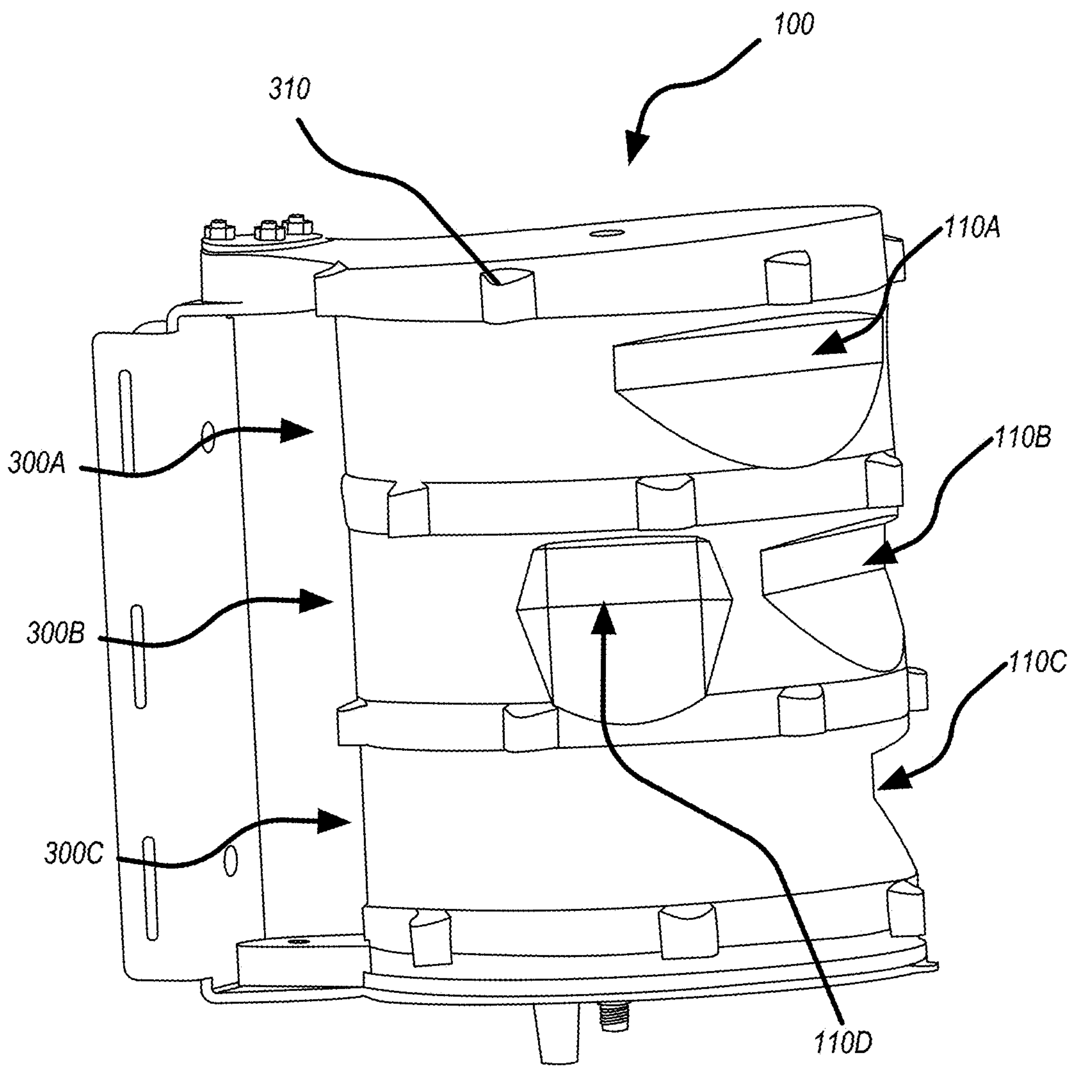
FIG. 3 illustrates an embodiment of the radar system.

Additionally, in at least one embodiment, the one or more radar subsystems 120A, 120B, . . . 120N along with the radar subsystem antennas 110A, 111A, 112A, 110B, . . . and the radar control unit 130 are partially or completely contained within a shared shell 310, or container. As such, the radar system 100 may be mounted to a common object, (e.g., a pole). FIG. 3 shows a representative physical shell 310. In this embodiment, antennas and/or antenna elements 110A, 111A, 112A, . . . connected to radar subsystem 120A are arranged behind a radome to point towards the desired FOV on the roadway, while the antennas connected to the other radar subsystems 120B, 120C, 120D, and 120E are respectively arranged behind radomes to point towards their respective desired FOVs on the roadway.

While mounting the antennas, radar subsystems, and control unit in the physical shell 310 facilitates precise relative placement of the antennas within the shell, imperfect manufacturing can result in small errors in this relative placement. Even when antenna placement is very precise, differences in properties of the electronics and transmission lines feeding the antennas can also vary. When the radar subsystems use conventional beamforming or use combined transmit and receive beamforming based on MIMO transmission and signal processing, a calibration procedure can be used to compensate for antenna placement errors or variations in the electronics. As an example, the entire assembled radar system 100 can be placed on a turntable within an anechoic chamber with one or more well characterized reflective targets placed at a known location (or locations) within the chamber. Each radar subsystem 120A, 120B, . . . 120N can be configured to provide to the control unit 130 information related to the radar return for that subsystem. Ideally, each radar subsystem 120A, 120B, . . . 120N is able to provide the raw signal from each receive antenna for signal transmitted from each unique transmit antenna. In this case, radar control unit 130, running a service routine only used for calibration, can compare these signals to what would be received if each antenna on each radar subsystem were designed and performing ideally.

Let $R_q$ represent the signal that would be measured for the qth transmit/receive antenna pair under the ideal case, and let $S_q$ represent the actual signal measured from the fully assembled radar system 100. The radar control unit 130 would then compute the calibration coefficient $C_q=R_q/S_q$ for each transmit/receive antenna pair and store the set of calibration coefficients in non-volatile memory. When the radar system 100 is placed into operation, either each individual radar subsystem 120A, 120B, . . . 120N or the radar control unit 130 can multiply each measured signal by the respective calibration coefficient to provide a calibrated signal. One of skill in the art will appreciate that this is only an example calibration, and more sophisticated calibration procedures can be applied. Regardless of the calibration, it is a feature of the proposed invention that rigidly connecting the multiple radars into a single radar system allows this calibration to be performed in the factory rather than after installation at the intersection, as the latter case represents an uncontrolled environment that would make the calibration process tedious and potentially unsafe for traffic engineers.

If the radar system 100 is incapable of providing the signal measured from the fully assembled radar system 100 for each transmit/receive antenna pair, then each radar subsystem 120A, 120B, . . . 120N can provide the final radar return as a function of the angle of the turntable relative to the one or more targets in the chamber. By comparing this radar return as a function of angle to the ideal radar return as a function of angle, radar control unit 130, or alternatively each radar subsystem 120A, 120B, . . . 120N, can use an optimization, such as a gradient search or simplex search, to find the calibration coefficient for each antenna that produces a measured radar return that matches or closely matches the ideal radar return. Again, these coefficients can be stored in non-volatile memory and used for processing radar returns when the radar system 100 is deployed at the intersection.

In the depicted embodiment, the physical shell 310 comprises a substantially cylindrical shell structure. The substantially cylindrical shell structure further comprises three separate sub-cylinders 300A, 300B, 300C (referred to collectively as "sub-cylinders 300"). Each of the sub-cylinders 300 comprises one or more radar subsystems 120A, 120B, . . . 120N. In at least one embodiment, the sub-cylinders 300 are configured to be affixed to each other in a stack such that they form the substantially cylindrical shell structure depicted in FIG. 3. In additional or alternative embodiments, the cylindrical nature of the sub-cylinders 300 may comprise a different stackable shape such as a square, a triangle, a hexagon, or any other stackable shape. As such, the cylindrical shapes depicted herein at not limiting but are provided for example sake.

In at least one embodiment, each of the sub-cylinders 300 may comprise one or more radar subsystem 120A, 120B, . . . 120N and an interconnecting bus that is configured to connect to a single radar control unit 130 within one of the sub-cylinders 300. For example, various sub-cylinders 300 may be available, but only a subset of those sub-cylinders 300 may comprise a radar control unit 130. Once the sub-cylinders 300 are stacked and affixed, the interconnecting bus allows each of the radar subsystems 120A, 120B, . . . 120N to communicate to the single radar control unit 130.

Further, in at least one embodiment, each of the sub-cylinders 300 may comprise a memory chip that includes specification information relating to the sub-cylinder 300A and/or the one or more radar subsystem(s) 120A, 120B, . . . 120N within the sub-cylinder 300A. For example, the single radar control unit 130 may be able to gather configuration information from each of the memory chips that allows the single radar control unit 130 to more easily self-configure for the data streams provided by the individual radar subsystems in the sub-cylinders 300.

Additionally or alternatively, each sub-cylinder 300 may comprise a radar control unit 130. Once the sub-cylinders 300 are stacked and affixed, each radar control unit 130 may function cooperatively with the other radar control units 130 in each of the sub-cylinders 300. Additionally, each radar control unit 130 may comprise a memory chip that includes specification information relating to the sub-cylinder 300A and/or the one or more radar subsystems 120A, 120B, . . . 120N within the sub-cylinder 300A. The memory chip may allow each radar control unit 130 to process the data streams from its own radar subsystems and to communicate that data to one or more of the other radar control units 130.

In at least one embodiment, a user can design a radar system 100 by selecting one or more prebuilt sub-cylinders 300 and then stacking and affixing the sub-cylinders 300 to each other. For example, one sub-cylinder 300A may comprise a radar subsystem 120C for monitoring a two-lane roadway positioned at the bottom of the intersection 200 relative to the location of the radar system 100. Similarly, sub-cylinder 300B may comprise radar subsystems 120B and 120D that are configured to monitor a one-lane roadway with a turning lane on the left and right side of the intersection 200 relative to the location of the radar system 100. Further, sub-cylinder 300C may comprise a radar subsystem 120A for monitoring a two-lane roadway positioned at the top of the intersection 200 relative to the location of the radar system 100. The above radar subsystems 120A, 120B, . . . 120N and sub-cylinders 300A, 300B, 300C are provided only by way of example and not limitation. Accordingly, a user can identify an intersection of interest, determine the specific parameters of the intersection, and then select the pre-built sub-cylinders 300A, 300B, 300C that meet the needs of the intersection.

Figure 4:
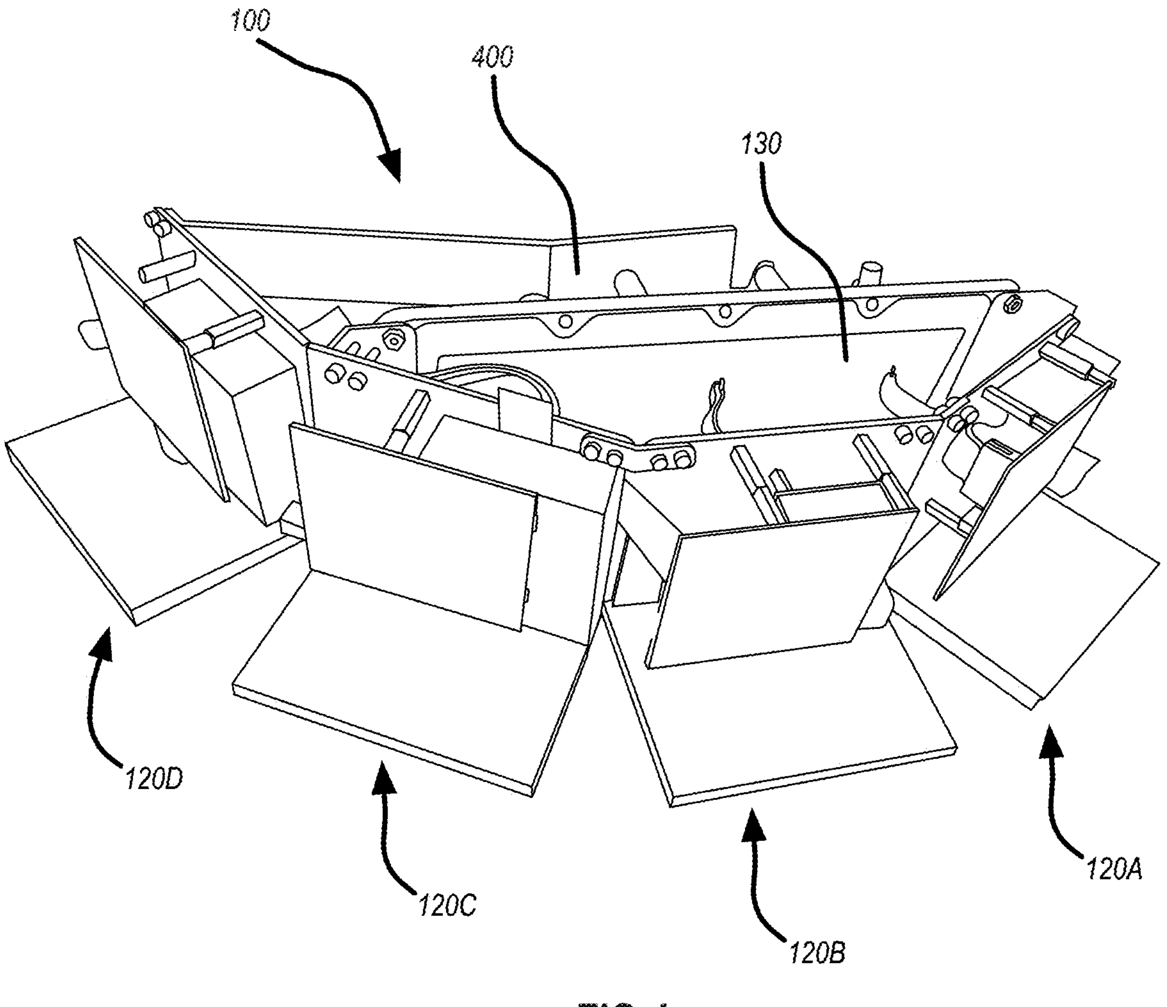
FIG. 4 illustrates yet another embodiment of radar system.

FIG. 4 illustrates yet another embodiment of radar system 100. In this embodiment, the radar system 100 comprises a common frame 400 that attaches to the radar control unit 130 and the plurality of radar subsystems 120A, 120B, 120C, 120D. In contrast to the embodiment of the radar system 100 depicted in FIG. 3, the various radar subsystems 120A, 120B, 120C, 120D are all positioned in a single common horizontal plane.

One will appreciate that the radar systems 100 of FIG. 3 and FIG. 4 are provided for the sake of example and explanation. Various additional or alternative configurations may comprise different numbers and arrangements of the plurality of radar subsystems 120A, 120B, 120C, 120D, 120E and different frames or shells holding the radar systems 100.

Figure 5A:
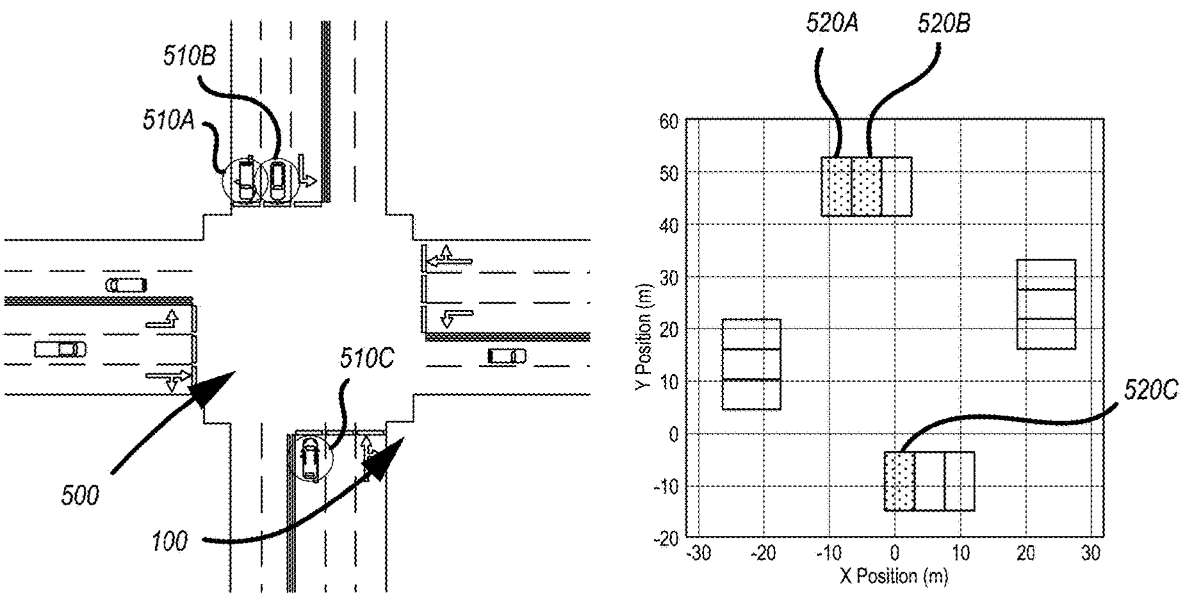
FIGS. 5A and 5B depict another intersection and a stop bar graphic for the intersection.
Figure 5B:
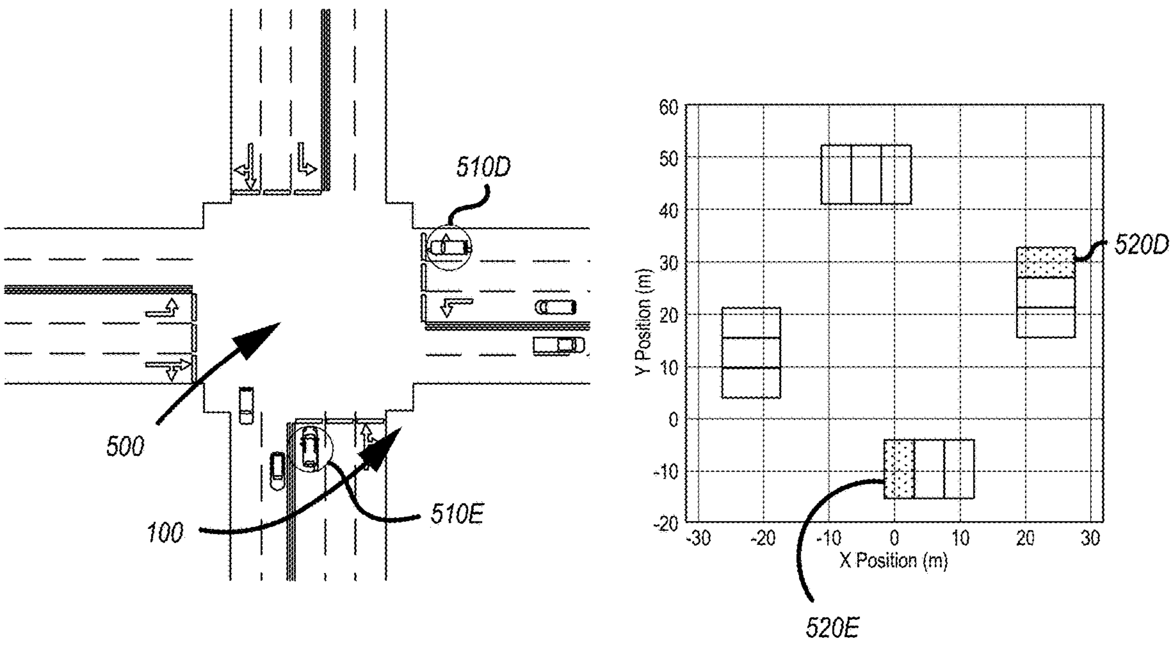

FIGS. 5A and 5B depict another intersection 500 and a stop bar graphic for the intersection. In FIGS. 5A and 5B, a radar system 100 may be located at a particular corner of the intersection 500. One will appreciate that the radar system 100 may be located at any corner or location relative to the intersection 500 as long as the radar system 100 has a generally unimpeded view of the intersection 500. The radar system 100 may be configured to distinguish between a first lane and a second lane of the first roadway.

As shown in FIG. 5A, three vehicles 510A, 510B, and 510C are at the stop bars. The accompanying stop bar graphic indicates that vehicles 510A, 510B, and 510C are at the stop bar by shading boxes 520A, 520B, and 520C, which each represent the corresponding lanes and stop bar locations at the intersection. Similarly, FIG. 5B depicts vehicles 510D and 510E at the stop bar of the intersection 500. The accompanying stop bar graphic shades boxes 520D and 520E to indicate the location of vehicles 510D and 510E at the intersection.

Accordingly, disclosed embodiments are capable of identifying vehicles entering an intersection. Further, disclosed embodiments comprise a radar system 100 that comprises multiple radars gathering data from a single common location and feeding the data into a radar control unit 130.

The following discussion now refers to a number of methods and method acts that may be performed. Although the method acts may be discussed in a certain order or illustrated in a flow chart as occurring in a particular order, no particular ordering is required unless specifically stated or is required because an act is dependent on another act being completed prior to the act being performed.

Figure 6:
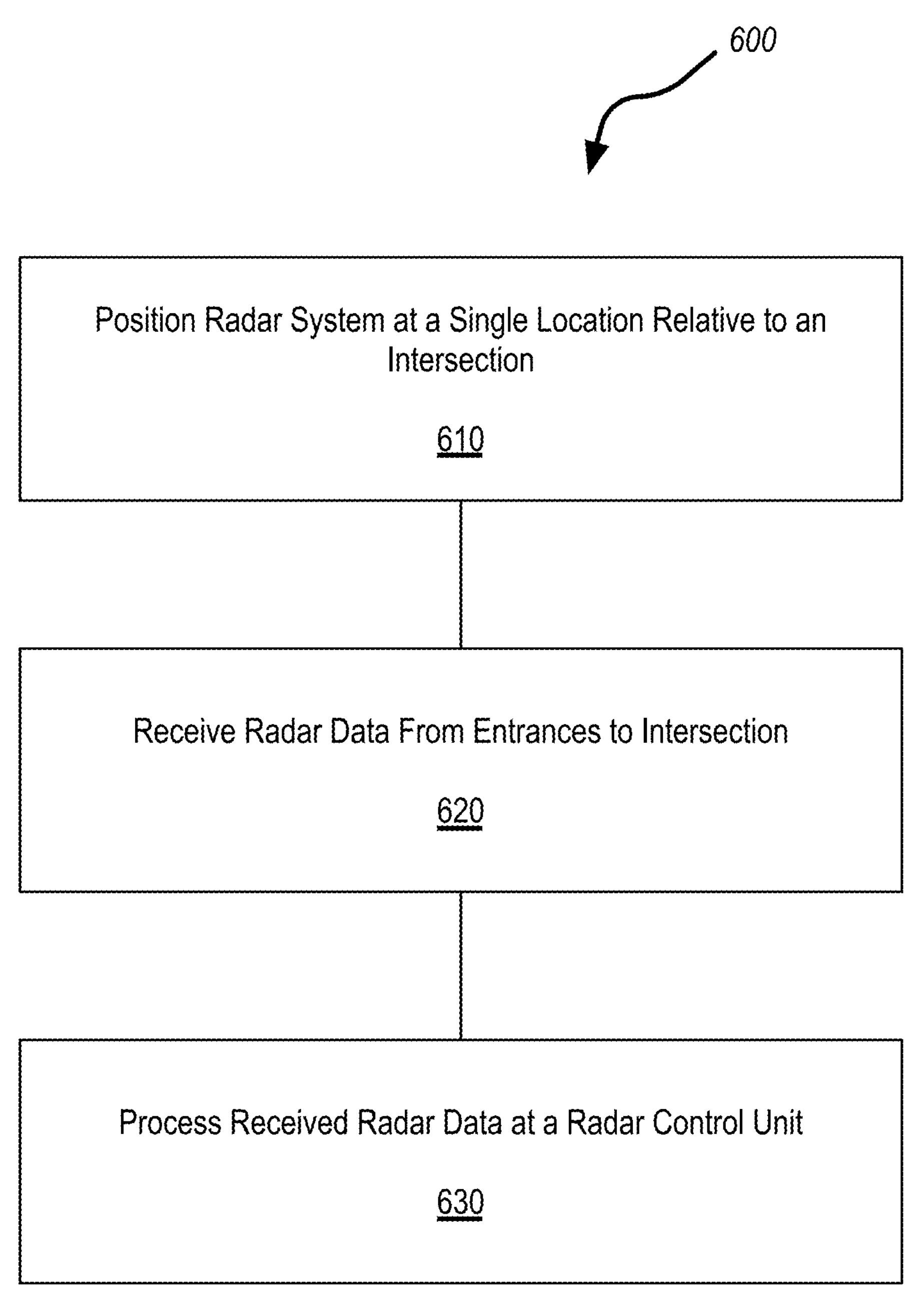
FIG. 6 illustrates a flow chart for a method of monitoring vehicles on transportation throughfares with a radar system.

FIG. 6 illustrates a flow chart for a method 600 of monitoring vehicles on a transportation throughfare intersection with a radar system. The method 600 comprises an act 610 of positioning a radar system. Act 610 comprises positioning the radar system at a single position relative to an intersection. For example, FIG. 2 and the associated description show a radar system 100 positioned at the corner of an intersection 200 of two roadways.

Method 600 also comprises an act 620 of receiving radar data. Act 620 comprises receiving, from one or more radar subsystems each including one or more antennas, radar data from all traffic entrances into the intersection. The radar system comprises a radar control unit in communication with the one or more radar subsystems. For example, FIGS. 1A-1C and the associated description describe a radar system 100 that is configured to receive data from one or more radar subsystems 120A, 120B, . . . 120N that are in communication with a radar control unit 130.

Method 600 also comprises an act 630 of processing the received radar data from the traffic entrances into the intersection by the radar control unit in communication with the one or more radar subsystems. For example, as depicted and described with respect to FIGS. 5A and 5B, the radar control unit can identify individual vehicles approaching and entering the intersection.

The methods or methods acts may be practiced by a computer system including one or more processors and computer-readable media such as computer memory. In particular, the computer memory may store computer-executable instructions that when executed by one or more processors cause various functions to be performed, such as the acts recited in the embodiments. For example, FIGS. 1A-1C and the associated description describe a radar control unit whose functions may be practiced by a processor and computer-readable media.

Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems. For example, FIG. 3 and the associated description describe embodiments where each sub-cylinder 300 comprises its own radar control unit 130 for processing the data from its own radar subsystems and communicating with radar control units 130 from other sub-cylinders 300 each with its own radar subsystems.

Disclosed embodiments may comprise or utilize a special purpose or general-purpose computer including computer hardware. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A radar system for monitoring vehicles on a roadway, the radar system comprising:

a radar control unit in communication with a plurality of radar subsystems;

the plurality of radar subsystems rigidly affixed within a common housing, wherein each radar subsystem within the plurality of radar subsystems includes one or more antennas configured to be directed toward a different portion of an intersection; and the radar system configured to:

be positioned at a single position relative to an intersection and affixed to a stationary object adjacent to the roadway, and receive radar data from all traffic entrances into the intersection using the plurality of radar subsystems.

2. The radar system as recited in claim 1, comprising multiple radar subsystems, wherein the multiple radar subsystems are positioned with the one or more antennas at the single position relative to an intersection.

3. The radar system as recited in claim 1, wherein the radar system comprises a transmitter that is selectively connected to sets of antennas selected from the one or more antennas.

4. The radar system as recited in claim 1, wherein the radar system comprises a transmitter that is simultaneously connected to a set of the one or more antennas.

5. The radar system as recited in claim 1, further comprising a transmitter transmitting a unique, orthogonal signal through each of a set of the one or more antennas.

6. The radar system as recited in claim 1, further comprising one or more switches connecting a set of the one or more antennas to a transmitter.

7. The radar system as recited in claim 1, wherein the radar control unit is configured to distinguish between targets in a first lane and a second lane of a first roadway at the intersection.

8. The radar system as recited in claim 1, further comprising a shared support structure that physically supports the radar control unit, the plurality of radar subsystems, and the one or more antennas.

9. The radar system as recited in claim 8, wherein the shared support structure comprises mounting points that physically direct the one or more antennas into predetermined directions that align with different areas of the intersection.

10. The radar system as recited in claim 9, wherein the shared support structure comprises a shell that at least partially encompasses the radar control unit, the plurality of radar subsystems, and the one or more antennas.

11. A method for monitoring vehicles on a transportation throughfare with a radar system, the method comprising:

positioning the radar system at a single position relative to an intersection;

receiving, from one or more antennas within a plurality of radar subsystems, radar data from all traffic entrances into the intersection; and wherein the radar system comprises:

a radar control unit in communication with a plurality of radar subsystems, and the plurality of radar subsystems rigidly affixed within a common housing, wherein each radar subsystem within the plurality of radar subsystems includes one or more antennas configured to be directed toward a different portion of an intersection.

12. The method as recited in claim 11, wherein the radar system comprises multiple radar subsystems, wherein the multiple radar subsystems are positioned with the one or more antennas at the single position relative to an intersection.

13. The method as recited in claim 11, wherein the radar system comprises a transmitter that is selectively connected to sets of antennas selected from the one or more antennas.

14. The method as recited in claim 11, wherein the radar system comprises a transmitter that is simultaneously connected to a set of the one or more antennas.

15. The method as recited in claim 11, further comprising transmitting, with a transmitter, a unique, orthogonal signal through each of a set of the one or more antennas.

16. The method as recited in claim 11, further comprising distinguishing, with the radar control unit, between targets in a first lane and a second lane of a first roadway at the intersection.

17. The method as recited in claim 11, further comprising supporting the radar control unit, the plurality of radar subsystems, and the one or more antennas with a shared support structure.

18. The method as recited in claim 17, wherein the shared support structure comprises mounting points that physically direct the one or more antennas into predetermined directions that align with different areas of the intersection.

19. The method as recited in claim 18, wherein the shared support structure comprises a shell that at least partially encompasses the radar control unit, the plurality of radar subsystems, and the one or more antennas.

20. A radar system for monitoring vehicles on a roadway, the radar system comprising:

a radar control unit in communication with a plurality of radar subsystems;

the plurality of radar subsystems, wherein:

each radar subsystem within the plurality of radar subsystems includes one or more antennas configured to be directed toward a different portion of an intersection, and the plurality of radar subsystems are rigidly affixed within a common housing, a rigid mechanical connection between the plurality of radar subsystems having a preconfigured position of each radar subsystem to monitor a predetermined configuration of lanes at the intersection; and the radar system configured to:

be positioned at a single position relative to an intersection, and receive radar data from all traffic entrances into the intersection using the plurality of radar subsystems.

* * * * *